(12) United States Patent
Demers et al.

(10) Patent No.: US 7,656,416 B2
(45) Date of Patent: Feb. 2, 2010

(54) APPARATUS FOR GENERATING ANTI-ALIASED AND STIPPLED 3D LINES, POINTS AND SURFACES USING MULTI-DIMENSIONAL PROCEDURAL TEXTURE COORDINATES

(75) Inventors: Eric Demers, Palo Alto, CA (US); Robert S. Mace, Scots Valley, CA (US)

(73) Assignee: ATI Technologies, Inc., Markham, Ontario (CA)

( * ) Notice: Subject to any disclaimer, the term of this patent is extended or adjusted under 35 U.S.C. 154(b) by 633 days.

(21) Appl. No.: 10/306,460

(22) Filed: Nov. 27, 2002

(65) Prior Publication Data

US 2004/0100474 A1  May 27, 2004

(51) Int. Cl.
*G09G 5/00* (2006.01)
(52) U.S. Cl. .................. 345/611; 345/505; 345/506
(58) Field of Classification Search ........... None
See application file for complete search history.

(56) References Cited

U.S. PATENT DOCUMENTS

| | | | |
|---|---|---|---|
| 5,794,016 A * | 8/1998 | Kelleher | 345/505 |
| 5,870,097 A * | 2/1999 | Snyder et al. | 345/426 |
| 6,717,576 B1 * | 4/2004 | Duluk et al. | 345/419 |

\* cited by examiner

*Primary Examiner*—Kee M Tung
*Assistant Examiner*—Jwalant Amin
(74) *Attorney, Agent, or Firm*—Vedder Price, P.C.

(57) ABSTRACT

A graphics processing circuit includes an anti-aliasing and stippling circuit operative to provide a primitive texture coordinate set in response to vertex data, the anti-aliasing and stippling circuit performing anti-aliasing operations, in parallel, with at least one appearance attribute determination operation on the vertex data, a rasterizer, coupled to the anti-aliasing and stippling circuit, operative to generate a pixel texture coordinate set in response to the primitive texture coordinate set, and apply an appearance value to a pixel defined by the pixel texture coordinate set, and a texture circuit, coupled to the rasterizer, operative to retrieve the appearance value from a corresponding one of a plurality of textures in a multi-texture map in response to the pixel texture coordinate set, the multi-texture map including data representing point, line and polygon texture data.

7 Claims, 5 Drawing Sheets

APPARATUS FOR GENERATING ANTI-ALIASED AND STIPPLED 3D LINES, POINTS AND SURFACES USING MULTI-DIMENSIONAL PROCEDURAL TEXTURE COORDINATES

FIELD OF THE INVENTION

The present invention generally relates to graphics processing circuitry and, more particularly, to processing circuitry for generating and applying anti-aliased and patterned textures to objects.

BACKGROUND OF THE INVENTION

Computer graphics processing systems, set top box systems or other graphics processing systems typically include a host processor, graphics/video processing circuitry, memory (e.g. frame buffer), and one or more display devices. The host processor may have a graphics application running thereon, which provides vertex data for a primitive (e.g. triangle) to be rendered on the one or more display devices. The display device, for example, a CRT display includes a plurality of scan lines comprised of a series of pixels. The graphics/video processing circuitry receives the vertex data and generates pixel data including appearance attributes (e.g. color, luminance, texture, stippling) which may be presented on the display devices according to a particular protocol. The pixel data is typically stored in the frame buffer in a manner that corresponds to the pixels location on the display device.

Display devices present an object or image to the viewer as an array of individual picture elements, or pixels. The pixels are each given a specific characteristic, for example, the color or texture of the object at the particular pixel's location. The pixels are closely spaced relative to one another and the corresponding display device filters the individual pixel color and texture values to form a composite image. If the pixel filtering is performed properly, the viewer perceives the displayed array of pixels as a virtually continuous image. However, despite the filtering, the viewer remains sensitive to aberrations (e.g. color or texture differences) in the rendered object, and graphics processing circuitry must be designed to minimize these aberrations. Visual aberrations may result, for example, when the image is insufficiently sampled.

Aliasing occurs in an image, for example, when the pixel sampling rate is significantly less than the highest frequency change in an image. If the pixel sampling frequency, for example, is less than twice the image's frequency of change, aliasing will occur and visual aberrations, such as improper or distorted coloring or texturing, will be introduced into the image. In addition to improper or distorted coloring or texturing, sampling artifacts (e.g. stair-step edges) may be introduced into the image. Conventional graphics processing circuitry typically contains several look-up tables or rely on full scene anti-aliasing to support anti-aliasing operations. The look-up tables can take up a significant amount of on chip real estate; thereby, preventing other graphics and/or video processing capabilities from being supported. In addition, accessing the several look-up tables to complete anti-aliasing operations takes up valuable processing time from other operations; thereby, decreasing graphics processing circuitry performance. Moreover, full scene anti-aliasing is costly from a performance standpoint and typically results in low quality images.

Stippling is the operation of masking out certain fragments produced by rasterization, thereby creating a stippling pattern. The stippling pattern is subsequently applied to rendered objects; thereby providing texture to the rendered object. Appearance attribute determination operations, such as stippling, typically are performed in the final rendering engine of the graphics/video processing circuitry, and are performed separate from and subsequent to the anti-aliasing on the object that the stippling pattern is to be applied. Such separate processing decreases graphics processing circuitry performance, for example, as the anti-aliasing operations are performed on the object before stippling and other appearance attribute operations are performed on the object. Thus, several processing passes per pixel are required before the object can be rendered.

FIG. 1 is a schematic representation of a line segment 10 being rendered onto a two dimensional space 12. The two dimensional space 12 may correspond to the screen space of a suitable display device (not shown). The two-dimensional space 12 is represented by a plurality of intersecting horizontal and vertical lines that form pixels 11. A pixel is one of a series of points along a raster scan line that when viewed in the aggregate, provides an image that may be presented on a suitable display device and perceived by a user. The line segment 10 may be provided, for example, by a larger primitive (e.g. triangle) intersecting the pixels 11 that define the two dimensional space 12.

To make an object, including the line segment 10, look more realistic when rendered on the two dimensional space 12, the line segment 10 is provided with an appearance attribute, for example, color, texture or other suitable attribute. A stippling pattern is one type of appearance attribute that may be applied to the sample points 14 along the line segment 10. The stippling pattern (e.g. a checkerboard design) is typically retrieved from a dedicated memory that is separate from, and does not contain, other types of appearance attributes (e.g. color, brightness). In conventional graphics processing systems, dedicated hardware is used to determine whether a particular sample point 14 is within the stippling pattern, and additional dedicated hardware is used to draw the stippling pattern at the sample point 14, if such sample point is determined to be within the stippling pattern. In those situations when the sample point is not within the center of the corresponding pixel, the rendered object may lack clarity as the stippling pattern is aligned with display screen position and not pixel position. Additionally, the several pieces of dedicated hardware required to apply the stippling pattern take up a significant amount of on-chip real estate, and the multiple memory look up operations required to retrieve and apply the stippling pattern takes up valuable processing time.

BRIEF DESCRIPTION OF THE DRAWINGS

The present invention and the related advantages and benefits provided thereby, will be best appreciated and understood upon review of the following detailed description of a preferred embodiment, taken in conjunction with the following drawings, where like numerals represent like elements, in which.

DETAILED DESCRIPTION OF A PREFERRED EMBODIMENT

A graphics processing circuit includes an anti-aliasing and stippling circuit operative to provide a primitive texture coordinate set in response to vertex data, the anti-aliasing and stippling circuit performing anti-aliasing operations, in parallel, with at least one appearance attribute determination operation on the vertex data. The graphics processing circuit includes a rasterizer, coupled to the anti-aliasing and stippling circuit, operative to generate a pixel texture coordinate set in response to the primitive texture coordinate set, and apply an appearance value to a pixel defined by the pixel texture coordinate set. A texture circuit, coupled to the rasterizer, is operative to retrieve the appearance value from a corresponding one of a plurality of textures in a multi-texture map in response to the pixel texture coordinate set, wherein the multi-texture map includes data representing point, line and polygon texture data.

A graphics processing method includes receiving vertex data of a primitive to be rendered, where the vertex data includes primitive type data. Next, anti-aliased pixel data is determined, in parallel, with textured pixel data. Then, the anti-aliased and textured pixel data is applied to a pixel to be rendered in response to the primitive type data. An exemplary embodiment of the present invention will now be described with reference to FIGS. 2-6.

Figure 2:
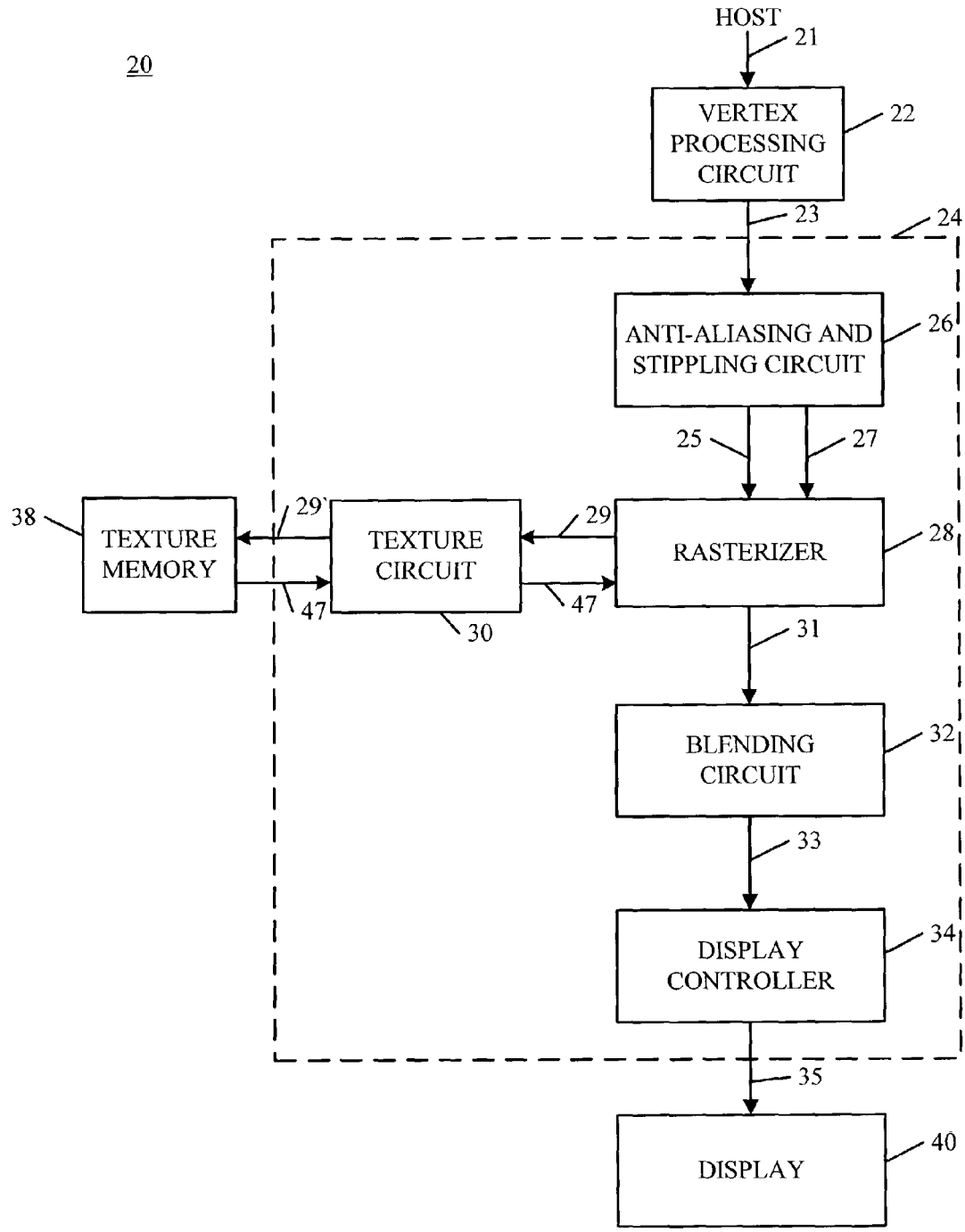
FIG. 2 is a schematic block diagram of a graphics processing system incorporating one example of a graphics processing circuit according to one embodiment of the present invention.

FIG. 2 is a schematic block diagram of a graphics processing system 20 incorporating one example of a graphics processing circuit 24 according to one embodiment of the present invention. The graphics processing circuit 24 is preferably a portion of a stand-alone graphics processor chip or may also be integrated with a host processor or other circuit, if desired, or part of a larger system. A vertex processing circuit 22 receives primitive data 21 relating to an object to be rendered from a processor, such as a host processor under control of an application (e.g. graphics and/or video) program running on the host processor, and provides 32-bit vertex data 23 values to the graphics processing circuit 24. The vertex data 23 may include primitive type (e.g. R value) data indicating the type of object to be rendered (e.g. point: R=0; line: R=1; triangle: R-2), the coordinates (e.g. x, y) of the object in display space, and the texture (e.g. color, brightness, stippling pattern) to be applied to the object and data indicating whether anti-aliasing is to be performed on the object. Alternatively, the data indicating whether anti-aliasing or stippling is to be performed is written by the application program to a specific register (not shown) within the graphics processing circuit 24 that is generally accessible, for example, by the anti-aliasing and stippling circuit 26.

The graphics processing circuit 24 includes an anti-aliasing and stippling circuit 26 operative to provide object drawing data 25 and a primitive texture coordinate set (e.g. S, T, R) 27 in response to the vertex data 23. The anti-aliasing and stippling circuit 26 is operative to perform anti-aliasing operations, in parallel, with at least one appearance attribute determination operation including, but not limited to color, texture and stippling operations on the vertex data 23. The anti-aliasing and stippling circuit 26 includes a plurality of sub-circuits that are operative to perform parallel anti-aliasing and stippling operations on the vertex data as described in greater detail below with reference to FIG. 3.

A rasterizer 28 is coupled to the anti-aliasing and stippling circuit 26, and is operative to generate a pixel texture coordinate set (e.g. $s_1$, $t_1$, $r_1$) 29 in response to the primitive texture coordinate set 27, where "i" represents the individual vertices that define the object to be rendered, and apply an appearance value 47 to the pixels representing the object to be rendered as defined by the pixel texture coordinate set 27; thereby, generating polygon pixel data 31. The polygon pixel data 31 is provided to a blending circuit 32.

A texture circuit 30 may include registers, arithmetic circuitry and logic circuitry, for example, arithmetic logic units (ALU), digital signal processing (DSP) circuits, discrete logic (e.g. AND, OR) gates, state machines and/or any other suitable hardware operative to, among other things, receive the pixel texture coordinate set 29 from the rasterizer 28 and map (e.g. determine address 29') the pixel texture coordinate set 29 to a unique corresponding segment of a texture memory 38. The texture circuit 30 is further operative to transmit an appearance value 47 maintained within the texture memory 38 to the rasterizer 28 for application to the pixels of the polygon to be rendered. The appearance value 47 may be a single value or a series of values depending on the type of object to which the appearance value 47 is to be applied.

Figure 4:
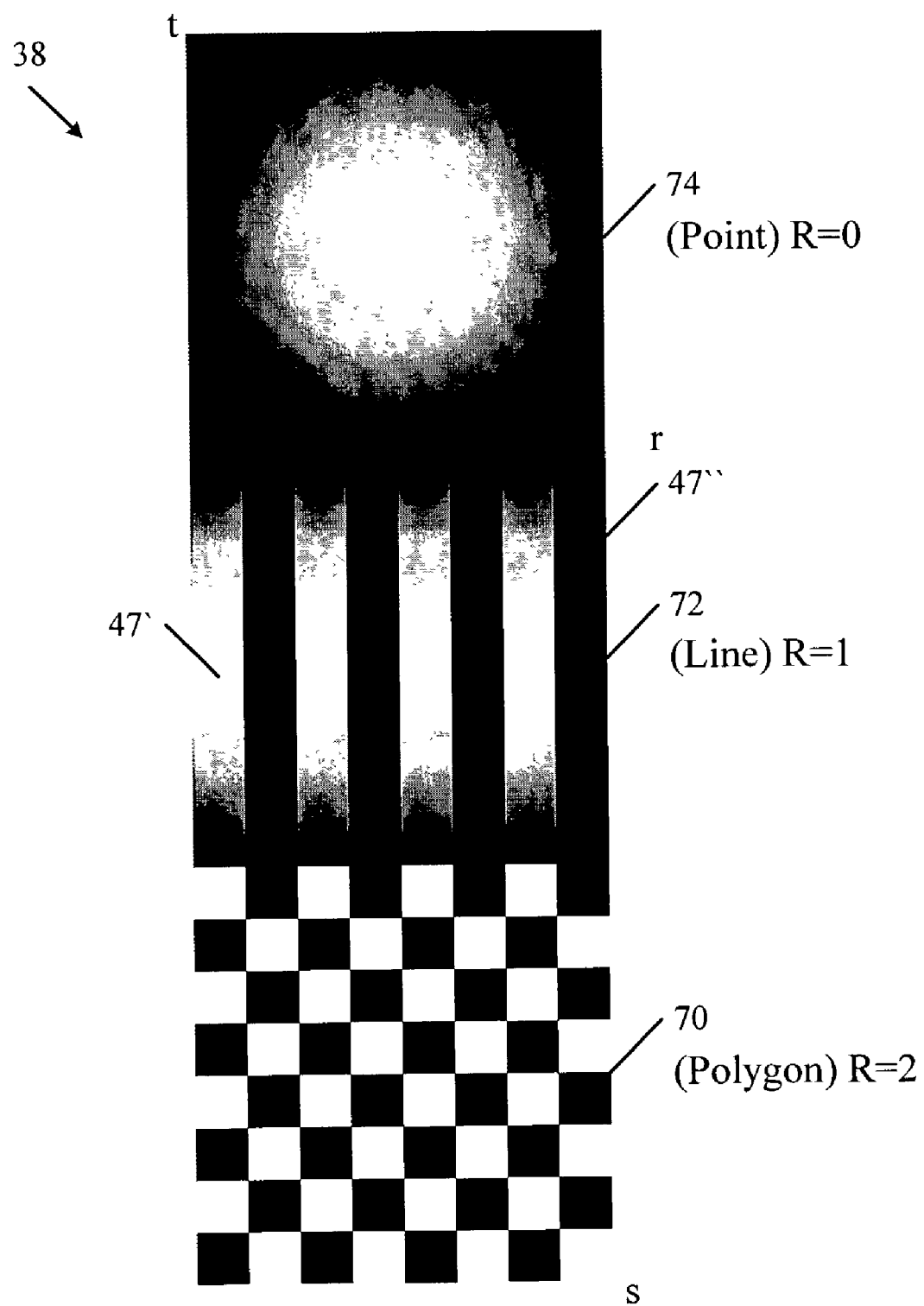
FIG. 4 is a cross-sectional block diagram of one embodiment of a multi-segment texture memory employed by the graphics processing system illustrated in FIG. 2.

Referring to FIG. 4, the texture memory 38 is divided into a series of segments 70-74, where each segment, and the data maintained therein, has a unique address corresponding to the pixel texture coordinate set (e.g. s, t, r) 29 provided by the rasterizer 28. A first segment 70 contains, for example, appearance values 47 that are applied to the pixels of a primitive (e.g. triangle) when the primitive type (e.g. R=2) data component of the vertex data 23 indicates that a polygon is to be rendered. As illustrated, the appearance values 47 represent, for example, a checkerboard or other suitable stippling pattern that is to be applied to the pixels that form the polygon.

A second segment 72 contains, for example, appearance values that are applied to the pixels that represent a line when the primitive type (e.g. R=1) data component of the vertex data 23 indicates that a line is to be rendered. The second segment contains, for example, alternating anti-aliasing 47' and stippling " patterns that are to be applied to the pixels that form a line.

A third segment 74 contains, for example, a continuous pattern of repeating appearance values 47 that are to be applied to a point when the primitive type (e.g. R=0) data component of the vertex data 23 indicates that a point is to be rendered. The continuous nature of the repeating appearance values 47 aids in providing anti-aliasing of individual points to be rendered. By employing the multi-segment texture map of the present invention, only a single texture memory 38 and corresponding single texture (e.g. appearance value) fetch operation is required to perform stippling and anti-aliasing operations. This results in enhanced graphics processing system performance when rendering objects as compared to conventional graphics processing systems which require multiple dedicated memory devices and multiple fetch operations to perform anti-aliasing and texturing operations.

Although illustrated as a single memory partitioned into three accessible data segments 70-74, the texture memory 38 may be implemented by any number or type of memory devices. Such a memory device may include, but not be limited to, RAM, ROM, CD-ROM, distributed memory such as servers on a network or any suitable storage medium that stores digital information or combination thereof. Also, instead of a single 3D texture, three 2D textures could be used instead.

Returning to FIG. 2, as the pixel texture coordinate set 29 values provided by the rasterizer 28 may be in floating point format, the mapped texture coordinate 29' may not correspond to a particular texel within the multi-segment texture memory 38. In the situation where the pixel texture coordinate set 29 does not map to a specific texel within the multi-segment texture memory 38, the texture circuit 30 retrieves the single nearest texel or fetches the surrounding texels and interpolates the texel value that watches the texture coordinates and provides the corresponding appearance value 47.

A blending circuit 32 may include registers, arithmetic circuitry and logic circuitry, for example, ALUs, DSPs, discrete logic gates, state machines and/or any other suitable hardware operative to blend the polygon pixel data 31 with any suitable pixel data; thereby, providing pixel data 33 having a blended appearance, if desired. The blended pixel data 33 is provided to a display controller 34. In an alternate embodiment, the blending circuit 32 may not be implemented. In such an embodiment, the polygon pixel data 31 may be provided to the display controller 34 from the rasterizer 28.

The display controller 34 provides pixel data 35, including any texture (e.g. stippling pattern) data formatted for proper display on a display device 40. The display controller 34 can be any device capable of formatting incoming pixel data to be presented on a corresponding display device 40. The display device 40 may be, for example, a CRT, an LCD, flat panel display, high definition television (HDTV) or any suitable display device or combination thereof.

Figure 3:
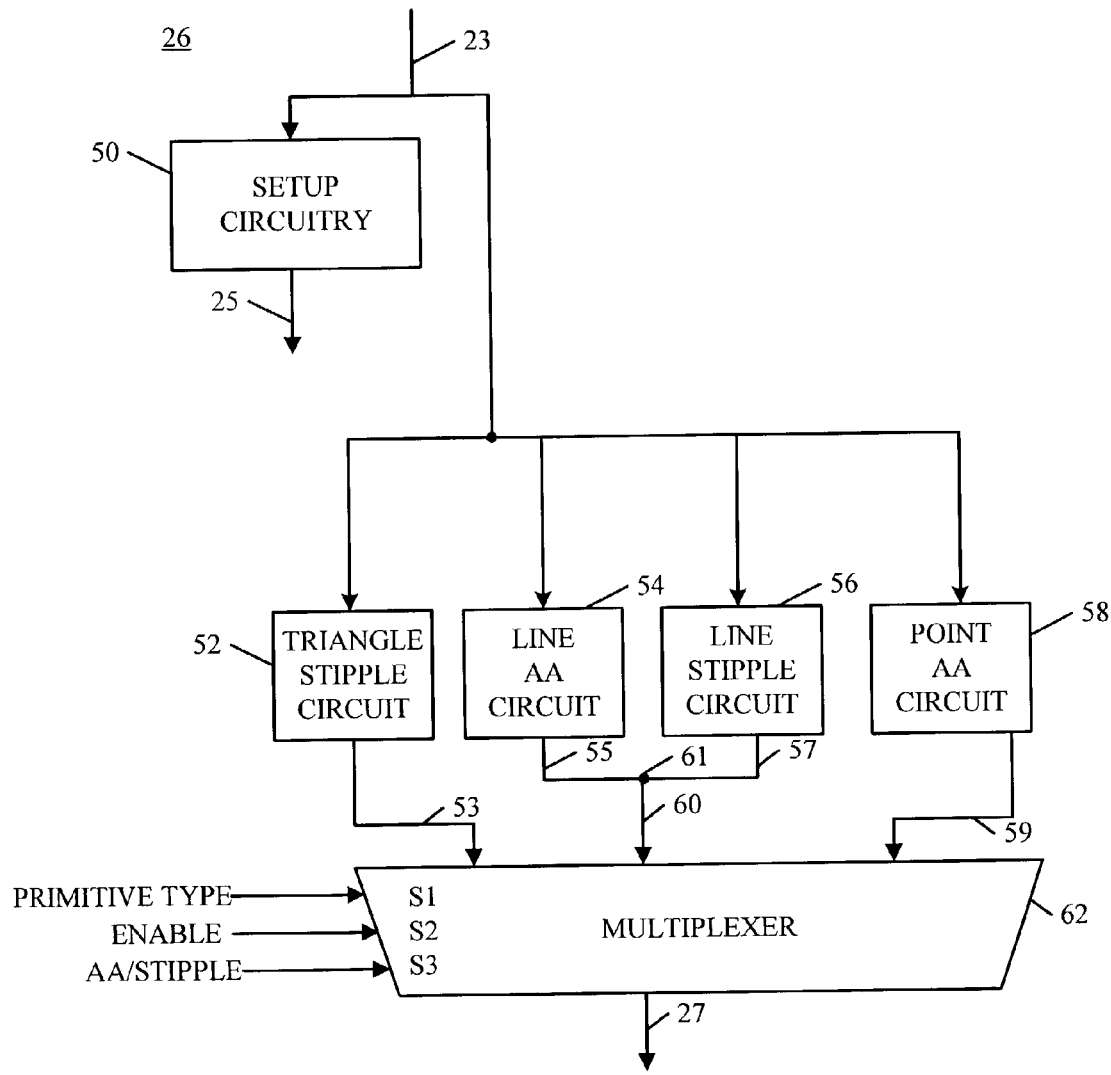
FIG. 3 is a schematic block diagram of one example of an anti-aliasing and stippling circuit employed by the graphics processing circuit illustrated in FIG. 2.

FIG. 3 is a schematic block diagram of one example of an anti-aliasing and stippling circuit 26 according to an exemplary embodiment of the present invention. Setup circuitry 50 may include registers, arithmetic circuitry and logic circuitry, for example, ALUs, DSPs, discrete logic circuits, state machines and/or any other suitable hardware or combination thereof, operative to receive the vertex data 23 and extract therefrom, for example, the display space (e.g. x, y) coordinates and/or any other suitable object data and provide standard object drawing data 25, for example, slope, matrix transformation and other suitable rasterization data for the object to be rendered. In parallel with determining the object drawing data 25, anti-aliasing and appearance attribute determination operations associated with the object to be rendered are performed.

A triangle stipple circuit 52 may include for example, registers for maintaining the vertex data 23' values provided by the vertex processing circuit 22 (FIG. 2), arithmetic circuitry and logic circuitry, for example, ALUs, DSPs. discrete logic circuits, state machines and/or any other suitable hardware or combination thereof operative to access the register containing the data indicating whether anti-aliasing and/or stippling is to be performed and generate polygon stippling (e.g. $S_p$, $T_p$, $R_p$) data 53 in response to the vertex data 23. The $S_p$ component of the polygon stippling data 53 is determined for each vertex of the primitive to be rendered, for example, by dividing the x-coordinate value in display space ($V_x$) by N, where N represents the number of sub-sample points (e.g. 12 or 16) per pixel, and then shifting the resulting value M bits to the right, where M represents the value defined by bits[3:0] of the received vertex data 23. The $T_p$ component of the polygon stippling data 53 is determined for each vertex of the primitive to be rendered, for example, by dividing the y-coordinate value in display space ($V_y$) by N, where N represents the number of sub-sample points (e.g. 12 or 16) per pixel, and then shifting the resulting value P bits to the right, where P represents the value defined by bits[19:16] of the received vertex data 23 value. The $R_p$ component of the polygon stippling data 53 corresponds to the primitive type data (e.g. R=2) component of the vertex data 23. The polygon stippling data 53 is provided as a first input to a multiplexer 62.

A line anti-aliasing circuit 54 may include registers for maintaining the vertex data 23 values provided by the vertex processing circuit 22 (FIG. 2), arithmetic circuitry and logic circuitry, for example, ALUs, DSPs. discrete logic circuits, state machine and/or any other suitable hardware or combination thereof operative to access the register containing the data indicating whether anti-aliasing and/or stippling is to be performed and generate anti-aliased line (e.g. $S_{1a}$, $T_{1a}$, $R_{1a}$) data 55 in response to the vertex data 23. The $S_{1a}$ component of the anti-aliased line data 55 is determined for each vertex of the primitive to be rendered, for example, by assigning it the value located in a register Sx, where "x" has a value (e.g. 0, 1, 2) corresponding to the vertex being operated on or assigning it the value of 0.0, if no anti-aliasing is to be performed on the vertex. The Sx register may be on-chip or off-chip. The $T_{1a}$ and $R_{1a}$ components of the anti-aliased line data 55, corresponds to the primitive type data (e.g. R=1) component of the vertex data 23.

A line stipple circuit 56 may include registers for maintaining the vertex data 23 provided by the vertex processing circuit 22 (FIG. 2), arithmetic circuitry and logic circuitry, for example, ALUs, DSPs, discrete logic circuits, state machines and/or any other suitable hardware or combination thereof operative to access the register containing the data indicating whether anti-aliasing and/or stippling is to be performed and generate stippled line (e.g. $S_s$, $T_s$, $R_s$) data 57 in response to the vertex data 23. As a line is defined by two points, the line stipple circuit 56 provides a start T coordinate and an end T coordinate, representing the length (or number) of appearance values to be retrieved from the multi-segment texture memory 38 before the corresponding stippling pattern (e.g. appearance value) is applied to the pixels that represent the line.

The $S_s$ component of the stippled line data 57 is assigned the value 0.0. The $R_s$ component corresponds to the primitive type data (e.g. R=1) component of the vertex data 23. The start T component is determined by adding an offset value to the current or received texel value of the vertex data 23 to ensure that the texture coordinate is aligned with the center of the pixel. The offset value is determined, for example, by the line stipple circuit 56 performing the following operation:

$$V0.x \text{ (modulo) } N$$

where V0.x is the initial x-coordinate of the line to be rendered and N is a value representing the number of sub-sample points per pixel. In an exemplary embodiment, the number of sub-sample points is 12 or 16. The end T component is determined by adding a value representing the length of the major axis to the start T value, where the major axis length is determined by selecting the larger of:

$$Dx = V1.x - V0.x$$

$$Dy = V1.y - V0.y$$

where Dx represents the length of the line along the x-axis, Dy represents the length of the line along the y-axis, and V0.x, V0.y, V1.x and V1.y represent the display coordinates of the line defined by vertices V0 and V1, respectively.

The anti-aliased line data 55 and the stippled line data 57 are coupled at node 61 to provide a unified line data 60, in response to whether anti-aliasing is to be performed. When anti-aliasing is to be performed, the anti-aliased line data 55 is provided to the multiplexer 62 as the unified line data 60;

otherwise, the stippled line data 57 is provided as the unified line data 60. When both anti-aliasing and line stippling are to be performed, the anti-aliased line data 55 and the stippled line data 57 are combined at node 61 to provide the unified line data 60.

A point anti-aliasing circuit 58 may include registers for maintaining the vertex data 23 provided by the vertex processing circuit 22, arithmetic circuitry and logic circuitry, for example, ALUs, DSPs, discrete logic circuits, state machine and/or any other suitable hardware or combination thereof operative to generate anti-aliased point (e.g. $S_{pt}$, $T_{pt}$, $R_{pt}$) data 59 in response to the vertex data 23. The $S_{pt}$ component of the anti-aliased point data 59 is determined, for example, by assigning it the value located in a register min_s, where the min_s register may be on-chip or off-chip. The $T_{pt}$ component of the anti-aliased point data 59 is determined, for example, by assigning it the value located in a register min_t, where the min_t register may be on-chip or off-chip. The $R_{pt}$ component of the anti-aliased point data 59 corresponds to the primitive type data (e.g. R=0) component of the vertex data 23. The anti-aliased point data 59 is provided as a third input to the multiplexer 62.

Although it is preferable for the anti-aliasing and stippling circuit to perform each of the triangle stippling, line anti-aliasing, line stippling and point anti-aliasing operations in parallel with each other and the object drawing data 25 determination operations, the benefits provided by the present invention can be obtained by performing the anti-aliasing operations in parallel with at least one of the appearance attribute determination (e.g. line stippling, point stippling) operations, with the remaining appearance attribute determination operations being performed at a later time. In this manner, graphics processing system performance is still enhanced as at least one anti-aliasing and stippling determination operations are performed simultaneously with the object drawing data determination operations.

The multiplexer 62 provides one of the polygon stippling data 53, anti-aliased point data 59, anti-aliased line data 55 or stippled line data 57 as the primitive texture coordinate set 27 that is transmitted to the rasterizer 28, in response to the primitive type data component of the vertex data 23 present at select input S1, enable data present at select input S2 and anti-aliasing/stippling data present at select input S3, as provided in Table 1 below:

TABLE 1

| S1 | S2 | S3 | Primitive Texture Coordinate Set Data |
|---|---|---|---|
| 0 | 0 | — | No data presented |
| 0 | 1 | — | anti-aliased point data (59) |
| 1 | 0 | — | No data presented |
| 1 | 1 | 0 | anti-aliased line data (55) |
| 1 | 1 | 1 | stippled line data (57) |
| 1 | 1 | 2 | anti-aliased line data (55) and stippled line data (57) |
| 2 | 0 | — | No data presented |
| 2 | 1 | — | polygon stippling data (53) |

The data at select inputs S2-S3 is provided by the application program executing on the processor. Alternatively, the select data S1-S3 can be provided directly to the triangle stipple circuit 52, line anti-aliasing circuit 55, line stipple circuit 56 and the point anti-aliasing circuit 58, respectively, such that the primitive coordinate set 27 will be directly provided by the selected one of the aforementioned circuits instead of through the multiplexer 62.

Figure 1:
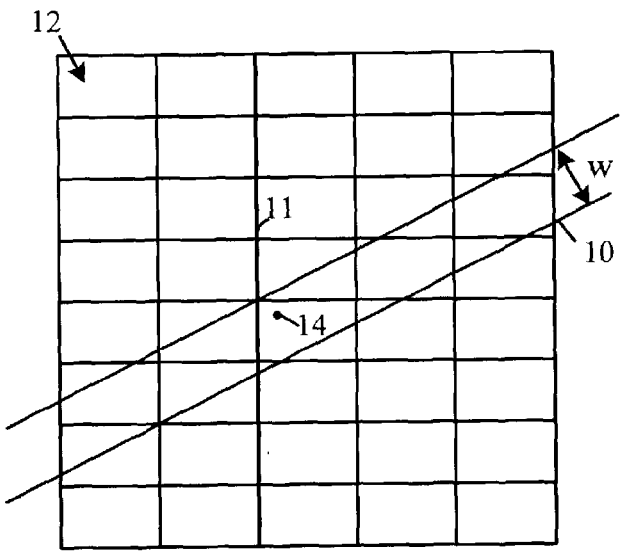
FIG. 1 is a schematic representation of a fragment being rendered onto a two-dimensional space.
Figure 5:
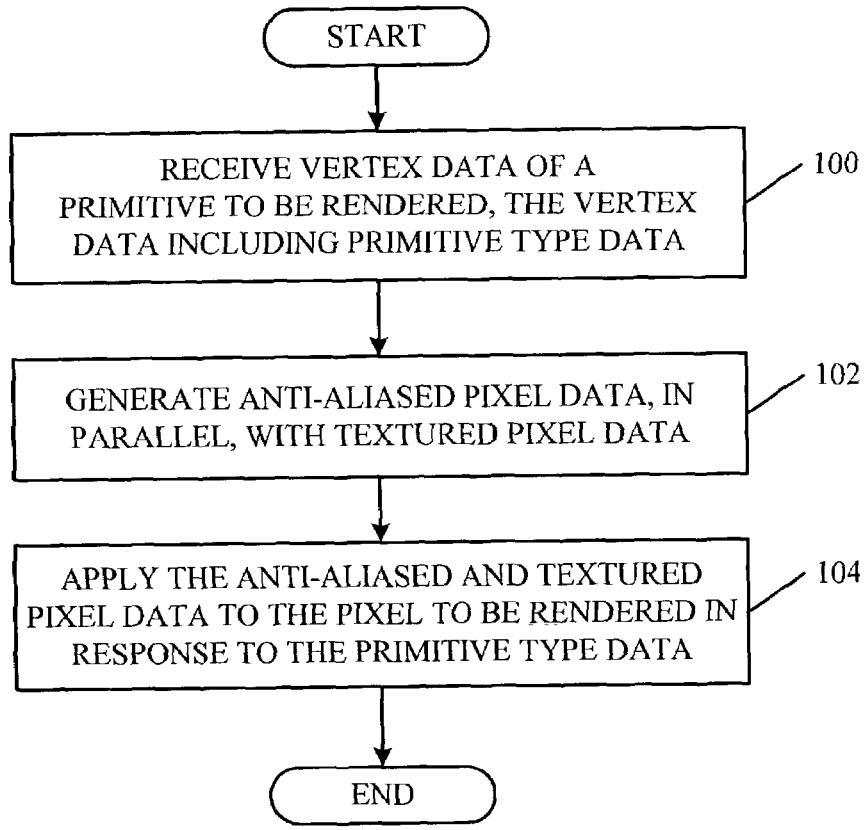
FIGS. 5-6 are flow charts illustrating the operations performed by the graphics processing circuit according to one example of the present invention.
Figure 6:
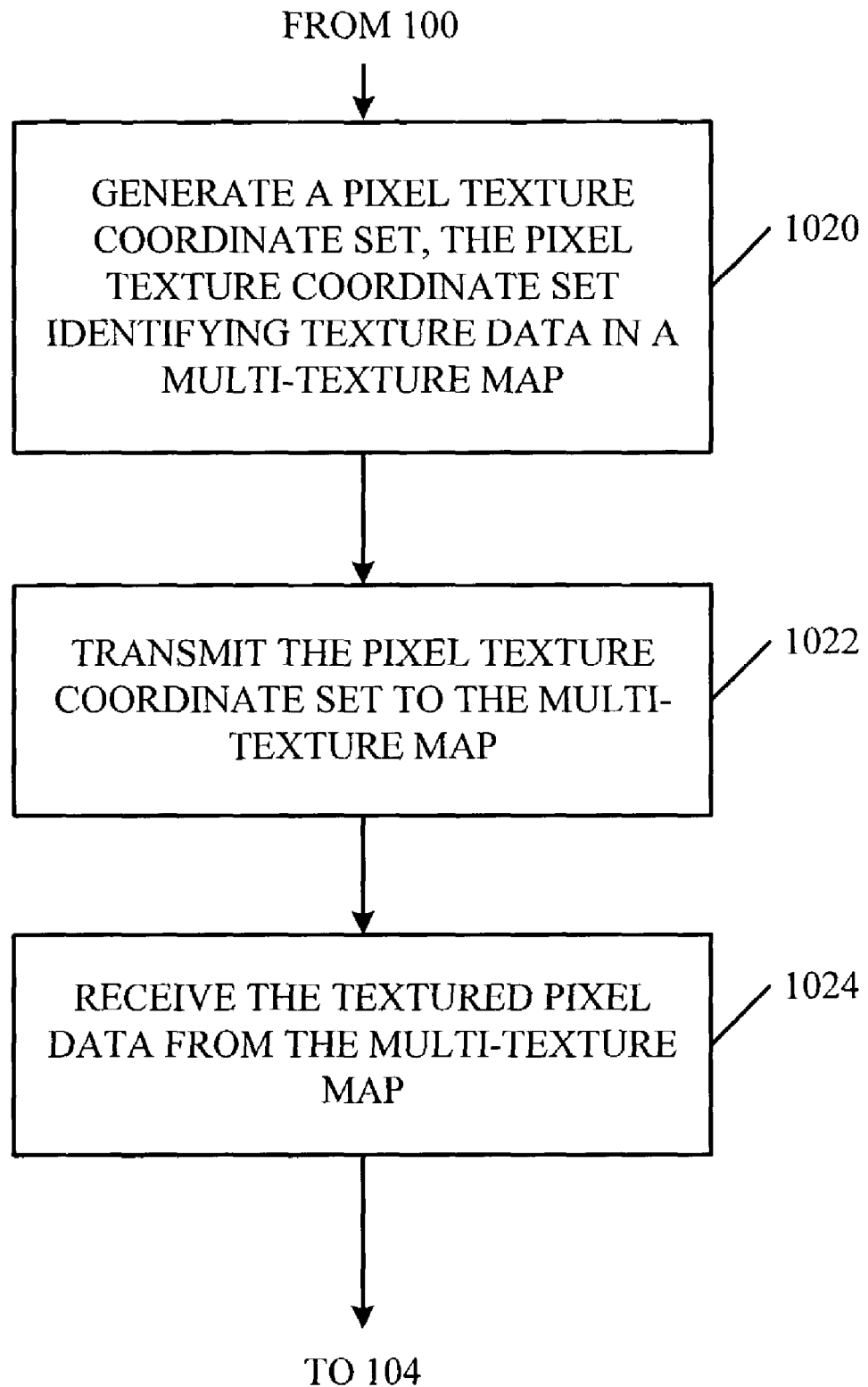

FIGS. 5-6 are flow charts illustrating the operations performed by the graphics processing circuit according to the present invention. The process begins at step 100 where the setup circuitry and the anti-aliasing and stippling circuit receives vertex data of the primitive to be rendered, where the vertex data includes data indicating what type of primitive is to be rendered and whether a texture, for example, a stippling pattern is to be applied to the polygon.

In step 102, anti-aliased pixel data is determined in parallel with the textured pixel data. Referring briefly to FIGS. 2 and 6, this step is accomplished, for example, by the anti-aliasing and stipple circuit 24 performing the several parallel operations described in greater detail above with reference to FIG. 3. In step 1022, the pixel texture coordinate set 29 is transmitted to the multi-texture map. This is accomplished, for example, by the rasterizer 28 generating the pixel texture coordinate set 29 in response to the primitive coordinate set 27 and transmitting the pixel texture coordinate set 29 to the texture circuit 30, which accesses the multi-texture map maintained in the texture memory 38. In step 1024, the addressed textured pixel data (e.g. appearance value) is received from the multi-texture map maintained in the texture memory 38.

In step 104, the anti-aliased and textured pixel data is applied to the pixel(s) to be rendered. This is accomplished, for example, by the rasterizer applying the appropriate texture (e.g. color, brightness, stippling pattern) retrieved from the multi-segment memory to the pixels that represent the object to be rendered, where the object (e.g. point, line, triangle) is identified by the primitive type data component of the vertex data 23. For example, when the object to be rendered is a triangle, the stippling pattern retrieved from the multi-segment texture memory is applied to the corresponding pixels that define the triangle.

The above detailed description of the invention and the examples described therein have been provided for the purposes of illustration and description. Although an exemplary embodiment of the present invention has been described in detail herein with reference to the accompanying drawings, it is to be understood and appreciated that the present invention is not limited to the embodiment disclosed, and that various changes and modifications to the invention are possible in light of the above teaching. Accordingly, the scope of the present invention is to be defined by the claims appended hereto.

What is claimed is:

1. A graphics processing circuit, comprising:
   a triangle stipple circuit operative to generate polygon stippling data in response to vertex data;
   a line anti-aliasing circuit, operative to generate anti-aliased line data in response to the vertex data, the line anti-aliasing data generation performed in parallel with the polygon stippling data generation;
   a line stipple circuit, operative to generate stippled line data in parallel with the polygon stippling data generation and the line anti-aliasing data generation;
   a point anti-aliasing circuit operative to generate anti-aliased point data in response to the vertex data in parallel with the polygon stippling data generation, the anti-aliased line data generation and the stippled line data generation, one of the polygon stippling data, anti-aliased line data, stippled line data and anti-aliased point data providing a primitive texture coordinate set;

a rasterizer operative to generate a pixel texture coordinate set in response to the primitive texture coordinate set, and operative to apply an appearance value to a pixel defined by the pixel texture coordinate set; and a texture circuit, coupled to the rasterizer, operative to retrieve the appearance value from a corresponding one of a plurality of textures in a multi-texture map, the multi-texture map including data representing point, line and polygon texture data.

2. The graphics processing circuit of claim, 1, further comprising a vertex processing circuit operative to generate the vertex data.

3. The graphics processing circuit of claim 2, further comprising a multi-segment texture memory operative to maintain the multi-texture map, wherein the multi-texture map further includes the point, line and polygon texture data maintained in separate one dimensional segments of the multi-segment texture memory.

4. The graphics processing circuit of claim 1, further comprising a multi-segment texture memory operative to maintain the multi-texture map, wherein the multi-texture map further includes the point, line and polygon texture data maintained in overlapping segments of the multi-segment texture memory.

5. A graphics processing circuit, comprising:

an anti-aliasing and stippling circuit operative to provide a primitive texture coordinate set in response to vertex data, the anti-aliasing and stippling circuit performing anti-aliasing operations, in parallel, with at least one appearance attribute determination operation on the vertex data;

a rasterizer, coupled to the anti-aliasing and stippling circuit, operative to generate a pixel texture coordinate set in response to the primitive texture coordinate set, and apply an appearance value to a pixel defined by the pixel texture coordinate set;

a texture circuit, coupled to the rasterizer, operative to retrieve the appearance value from a corresponding one of a plurality of textures in a multi-texture map in response to the pixel texture coordinate set, the multi-texture map including data representing point, line and polygon texture data; and wherein the anti-aliasing and stippling circuit farther comprises a line anti-aliasing circuit operative to generate anti-aliased line data in response to the vertex data, and a line stipple circuit, coupled to the line anti-aliasing circuit, operative to generate line stippling data in parallel with the line anti-aliasing circuit, the line anti-aliasing circuit and the line stipple circuit each providing a portion of the primitive texture coordinate set.

6. A graphics processing circuit, comprising:

an anti-aliasing and stippling circuit operative to provide a primitive texture coordinate set in response to vertex data, the anti-aliasing and stippling circuit performing anti-aliasing operations, in parallel, with at least one appearance attribute determination operation on the vertex data;

a rasterizer, coupled to the anti-aliasing and stippling circuit, operative to generate a pixel texture coordinate set in response to the primitive texture coordinate set, and apply an appearance value to a pixel defined by the pixel texture coordinate set;

a texture circuit, coupled to the rasterizer, operative to retrieve the appearance value from a corresponding one of a plurality of textures in a multi-texture map in response to the pixel texture coordinate set, the multi-texture map including data representing point, line and polygon texture data; and wherein the anti-aliasing and stippling circuit fUrther comprises a triangle stipple circuit operative to generate polygon stippling data in response to the vertex data, and a point anti-aliasing circuit, coupled to the triangle stipple circuit, operative to perform anti-aliasing operations on the vertex data in parallel with the polygon stippling data generation of the triangle stipple circuit, the triangle stipple circuit and the point anti-aliasing circuit each providing a portion of the primitive texture coordinate set.

7. A graphics processing circuit, comprising:

an anti-aliasing and stippling circuit operative to provide a primitive texture coordinate set in response to vertex data, the anti-aliasing and stippling circuit performing anti-aliasing operations, in parallel, with at least one appearance attribute determination operation on the vertex data;

a rasterizer, coupled to the anti-aliasing and stippling circuit, operative to generate a pixel texture coordinate set in response to the primitive texture coordinate set, and apply an appearance value to a pixel defined by the pixel texture coordinate set;

a texture circuit, coupled to the rasterizer, operative to retrieve the appearance value from a corresponding one of a plurality of textures in a multi-texture map in response to the pixel texture coordinate set, the multi-texture map including data representing point, line and polygon texture data; and a multi-segment texture memory operative to maintain the multi-texture map, wherein the multi-texture map further includes the point, line and polygon texture data maintained in separate one dimensional segments of the multi-segment texture memory.

* * * * *

UNITED STATES PATENT AND TRADEMARK OFFICE
CERTIFICATE OF CORRECTION

PATENT NO. : 7,656,416 B2 Page 1 of 1
APPLICATION NO. : 10/306460
DATED : February 2, 2010
INVENTOR(S) : Demers et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 989 days.

Signed and Sealed this

Eighteenth Day of January, 2011

David J. Kappos
*Director of the United States Patent and Trademark Office*